(12) United States Patent
Ode et al.

(10) Patent No.: US 9,083,433 B2
(45) Date of Patent: Jul. 14, 2015

(54) WIRELESS COMMUNICATION SYSTEM

(75) Inventors: Takayoshi Ode, Kawasaki (JP); Kazuhisa Obuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 13/169,672

(22) Filed: Jun. 27, 2011

(65) Prior Publication Data

US 2011/0256826 A1    Oct. 20, 2011

Related U.S. Application Data

(63) Continuation of application No. PCT/JP2009/051440, filed on Jan. 29, 2009.

(51) Int. Cl.
*H04B 7/14*        (2006.01)
*H04B 7/26*        (2006.01)
*H04B 7/155*       (2006.01)
*H04W 52/02*       (2009.01)
*H04W 84/04*       (2009.01)

(52) U.S. Cl.
CPC .......... *H04B 7/2606* (2013.01); *H04B 7/15535* (2013.01); *H04W 52/0232* (2013.01); *H04W 52/0235* (2013.01); *H04W 84/047* (2013.01); *Y02B 60/50* (2013.01)

(58) Field of Classification Search
CPC ............ H04L 25/49; H04B 7/14; H04B 1/38; H04Q 7/30; H04Q 7/20; H04Q 7/38
USPC ......... 455/7–25, 436, 561, 560, 343, 574, 92; 370/315–327, 311
See application file for complete search history.

(56) References Cited

U.S. PATENT DOCUMENTS

| | | | |
|---|---|---|---|
| 4,794,649 A * | 12/1988 | Fujiwara | ............................ 455/9 |
| 5,499,395 A * | 3/1996 | Doi et al. | .................... 455/422.1 |
| 5,802,469 A | 9/1998 | Nounin et al. | |
| 7,664,538 B2 * | 2/2010 | Watanabe et al. | ............. 455/574 |

(Continued)

FOREIGN PATENT DOCUMENTS

| | | |
|---|---|---|
| CN | 1964220 | 5/2007 |
| JP | 05-055969 | 3/1993 |

(Continued)

OTHER PUBLICATIONS

Decision of Rejection issued for corresponding Japanese Patent Application No. 2010-548296, issued Jun. 11, 2013, with partial English translation.

(Continued)

*Primary Examiner* — Edward Urban
*Assistant Examiner* — Ralph H Justus
(74) *Attorney, Agent, or Firm* — Myers Wolin, LLC

(57) ABSTRACT

A wireless communication system includes a wireless base station, a mobile station configured to communicate with the wireless base station, and a relay station configured to relay the communication between the wireless base station and the mobile station. When the number of the mobile stations communicating with the wireless base station is judged to have become smaller than or equal to a given number, a power controller in the relay station executes at least one of power control to cut off the power for relaying the communication, power control to perform intermittent operation, and power control to perform power-saving operation.

13 Claims, 19 Drawing Sheets

(56) References Cited

U.S. PATENT DOCUMENTS

| | | | |
|---|---|---|---|
| 8,320,288 B2* | 11/2012 | Sakoda | 370/311 |
| 2005/0014464 A1* | 1/2005 | Larsson | 455/11.1 |
| 2006/0098592 A1 | 5/2006 | Proctor Jr. et al. | |
| 2006/0166618 A1* | 7/2006 | Bakaimis | 455/11.1 |
| 2006/0268796 A1* | 11/2006 | Watanabe et al. | 370/338 |
| 2007/0071128 A1* | 3/2007 | Meir et al. | 375/297 |
| 2008/0285500 A1* | 11/2008 | Zhang et al. | 370/315 |
| 2009/0097449 A1* | 4/2009 | Jin | 370/331 |
| 2010/0067417 A1* | 3/2010 | Zhou et al. | 370/311 |
| 2010/0184432 A1* | 7/2010 | Yano et al. | 455/435.1 |
| 2011/0045763 A1* | 2/2011 | Mohanty et al. | 455/7 |

FOREIGN PATENT DOCUMENTS

| | | |
|---|---|---|
| JP | 08-275243 | 10/1996 |
| JP | 2001-077747 | 3/2001 |
| JP | 2006-510326 | 3/2006 |
| JP | 2007-158662 | 6/2007 |
| JP | 2007-251789 A | 6/2007 |
| JP | 2007-251789 | 9/2007 |
| JP | 2007-251789 A | 9/2007 |
| KR | 1020060123023 | 12/2006 |
| WO | 2008/129680 | 10/2008 |

OTHER PUBLICATIONS

International Search Report issued for corresponding International Patent Application No. PCT/JP2009/051440, mailed Apr. 28, 2009.
Notice of Preliminary Rejection issued for corresponding Korean Patent Application No. 10-2011-7015645, mailed Sep. 18, 2012, with English translation.
Office Action issued for corresponding Japanese Patent Application No. 2010-548296 dated Oct. 2, 2012 with partial English translation.
First Notification of Office Action issued for corresponding Chinese Patent Application No. 200980153959.6, dated Jun. 5, 2013 with full English translation.

* cited by examiner

|  | (1) | (2) | (3) | (4) |
|---|---|---|---|---|
| Radio Link r1 | OFF | OFF | OFF | OFF |
| Radio Link r2 | OFF | OFF | OFF | Intermittent |
| Radio Link r3 | OFF | Intermittent | Intermittent | OFF |
| Radio Link r4 | OFF | Intermittent | ON | ON |

FIG. 8

WIRELESS COMMUNICATION SYSTEM

This is a continuation of International Application PCT/JP2009/051440, filed on Jan. 29, 2009, now pending, the contents of which are herein wholly incorporated by reference.

FIELD

The present invention relates to wireless communication systems which include, for example, a mobile communication system and a wireless LAN (Local Area Network).

BACKGROUND

In recent years, new high-speed communication service called LTE (Long Term Evolution) has been expected to become standards for the communications of mobile stations such as mobile phones, and LTE-Advanced systems, which are an improved version of LTE systems, have been under discussion at the 3GPP (3rd Generation Partnership Project).

LTE-Advanced systems are intended also as IMT (International Mobile Telecommunication)-Advanced systems, which are an improved version of IMT-2000 systems and have been decided to be given consideration at the ITU-R (International Telecommunication Union Radio communications sector).

Typical examples of IMT-2000 systems are W-CDMA (Wideband-Code Division Multiple Access), CDMA one, and WiMax (Worldwide Interoperability for Microwave Access).

For LTE-Advanced systems, consideration is being given, based on LTE systems, to widening of uplink and downlink bandwidths, uplink MIMO (Multiple Input Multiple Output), MBMS (Multimedia Broadcast Multicast Service), and introduction of a relay station (repeater station) between a wireless base station and a mobile station.

SUMMARY

According to an aspect of the invention, a wireless communication system includes: a wireless base station; mobile stations each configured to communicate with the wireless base station; and a relay station configured to relay communication between the wireless base station and the mobile stations, wherein the relay station includes a power controller which is configured to execute at least one of power control to cut off power for relaying the communication, power control to perform intermittent operation, and power control to perform power-saving operation if it is judged that a number of the mobile stations communicating with the wireless base station has become smaller than or equal to a given number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates how a dead area is dealt with.

FIG. 8 is a diagram explaining the power control.

DESCRIPTION OF EMBODIMENTS

Figure 1:
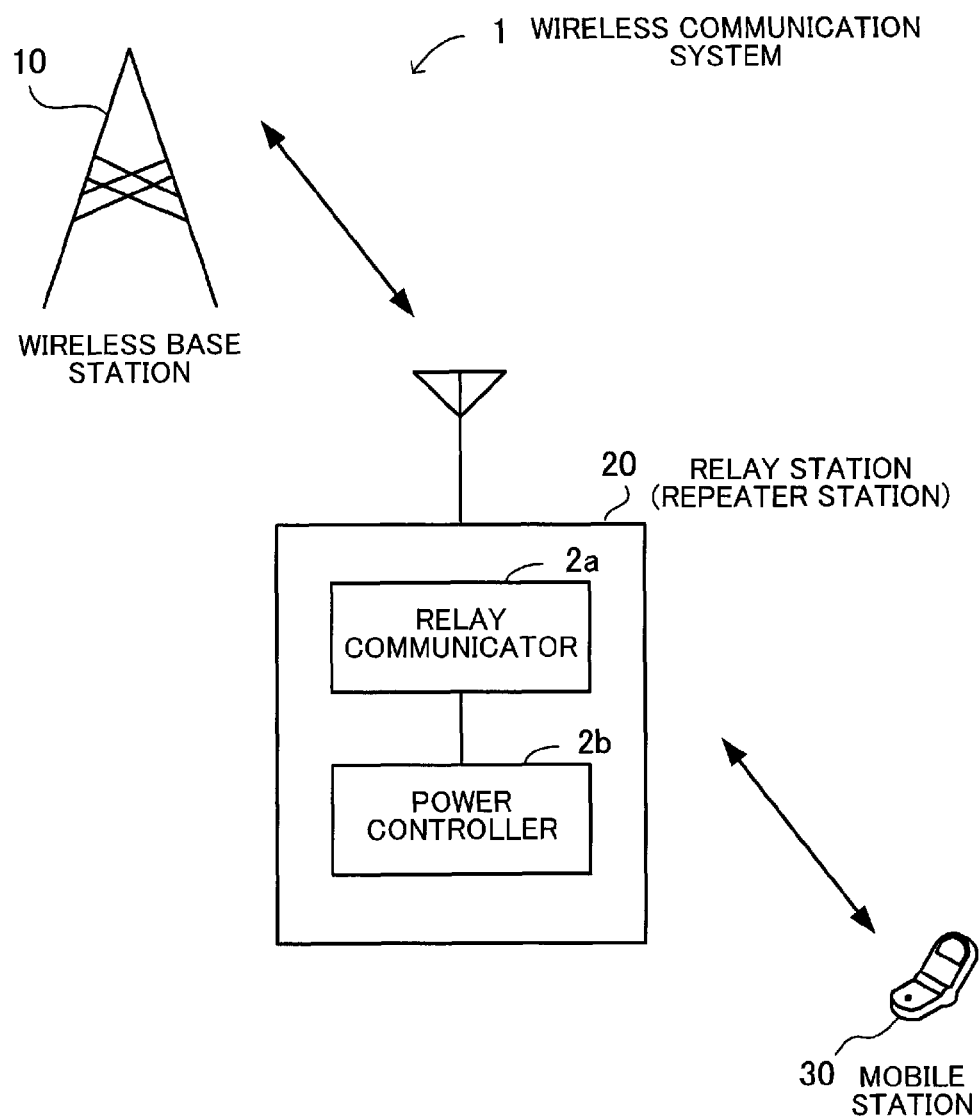
FIG. 1 illustrates an exemplary configuration of a wireless communication system.

Embodiments of the present invention will be described below with reference to the accompanying drawings. FIG. 1 illustrates an exemplary configuration of a wireless communication system. The wireless communication system 1 includes a wireless base station 10, a mobile station 30 configured to communicate with the wireless base station 10, and a relay station 20 configured to relay the communication between the wireless base station 10 and the mobile station 30.

The relay station 20 includes a relay communicator 2*a* and a power controller 2*b*. The relay communicator 2*a* controls the transmission and reception of the relay communication between the wireless base station 10 and the mobile station 30. The power controller 2*b* is aware of the number of the mobile stations 30 communicating with the wireless base station 10, and if it is judged that the number of the communicating mobile stations 30 has become smaller than or equal to a given number, the power controller 2*b* executes at least one of power control to cut off the power for relaying the communication, power control to perform intermittent operation, and power control to perform power-saving operation.

Figure 2:
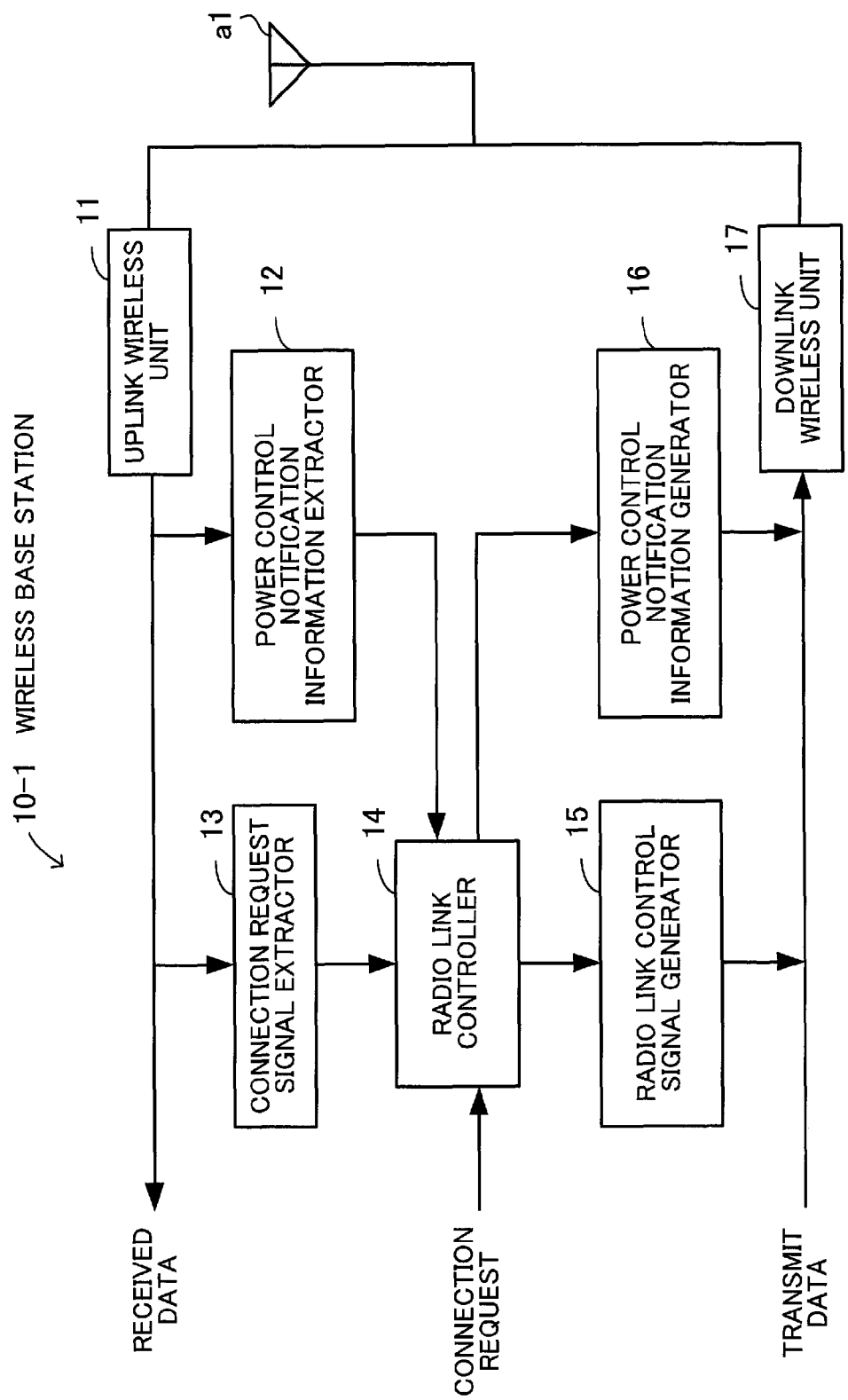
FIG. 2 illustrates an exemplary configuration of a wireless base station.

The manner of how the wireless base station 10, the relay station 20 and the mobile station 30 are configured will be now described. FIG. 2 illustrates an exemplary configuration of the wireless base station. The wireless base station 10-1 includes an antenna a1, an uplink wireless unit 11, a power control notification information extractor 12, a connection request signal extractor 13, a radio link controller 14, a radio link control signal generator 15, a power control notification information generator 16 (corresponding to a timing signal notifier), and a downlink wireless unit 17.

The uplink wireless unit 11 down-converts the radio signal received from the relay station 20 or the mobile station 30 via the antenna a1 and outputs the received data. When power control notification information (e.g., information to the effect that the power control is to be executed at the relay station 20 or information on power control start timing) is received from the relay station 20, the power control notification information extractor 12 extracts the power control notification information from the received data. When a connection request signal is received from the mobile station 30 or the relay station 20, the connection request signal extractor 13 extracts the connection request signal from the received data.

The radio link controller 14 performs radio link control in accordance with the power control notification information, the connection request signal from the mobile station 30 or the relay station 20, and a connection request signal of its own. The radio link control signal generator 15 generates a radio link control signal and multiplexes the generated signal and transmit data.

The power control notification information generator generates power control notification information (e.g., information on the power control start timing for causing the relay station 20 to execute the power control) and superimposes the generated information on the transmit signal. The downlink wireless unit 17 up-converts the transmit data and transmits the converted data via the antenna a1.

The relay station will be explained below. The relay station is provided between a wireless base station and a mobile station with a view to expanding the service area (cell extension) of the wireless base station or to dealing with a dead area (dead spot), for example.

Figure 3:
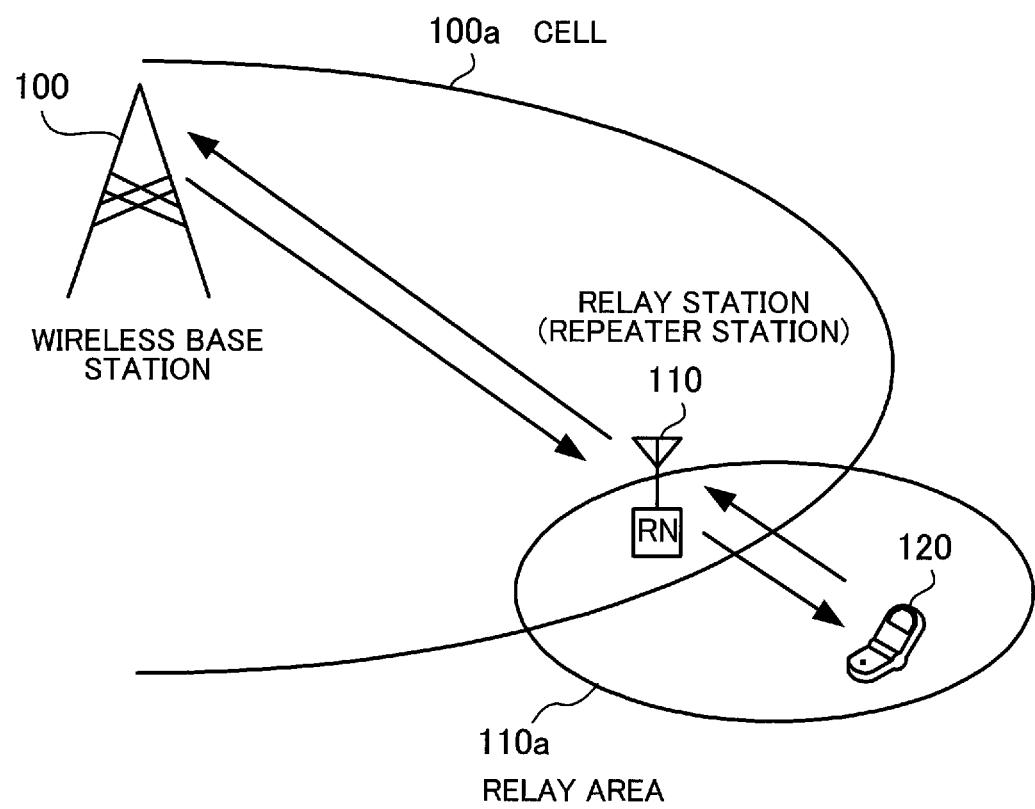
FIG. 3 illustrates how a service area is expanded.

FIG. 3 illustrates how a service area is expanded. A mobile station 120 is located outside the cell 100a of a wireless base station 100, and a relay station 110 is installed inside the cell 100a. The relay station 110 has a relay area 110a covered thereby, and the mobile station 120 is located inside the relay area 110a.

If the relay station 110 does not exist, the mobile station 120 is unable to communicate with the wireless base station 100 because it is located outside the cell 100a. However, if the relay station 110 is installed as illustrated and also if the mobile station 120 exists within the relay area 110a of the relay station 110, the wireless base station 100 and the mobile station 120 can communicate with each other because the wireless communication is relayed by the relay station 110, even though the mobile station 120 is located outside the cell 100a.

Figure 4:
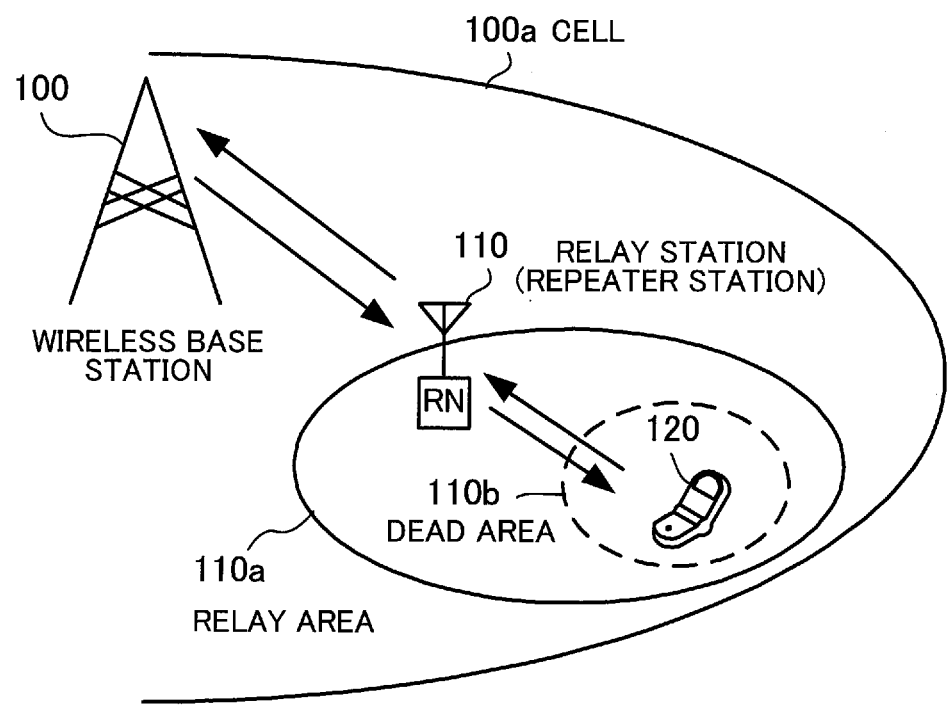

FIG. 4 illustrates how a dead area is dealt with. The relay station 110 is installed inside the cell 100a of the wireless base station 100. Let it be assumed that a dead area 110b exists within the cell 100a and that the mobile station 120 is located inside the dead area 110b. The relay area 110a of the relay station 110 covers the dead area 110b.

Without the relay station 110, it is difficult for the mobile station 120 to communicate with the wireless base station 100 since the mobile station 120 exists within the dead area 110b. However, if the relay station 110 is installed as illustrated and also if the relay area 110a of the relay station 110 covers the dead area 110b, the wireless base station 100 and the mobile station 120 can communicate with each other because the wireless communication is relayed by the relay station 110, even though the mobile station 120 is located within the dead area 110b.

As conventional wireless techniques, a technique has been proposed in which a receiving circuit for receiving wide- and medium-band signals is powered off during the standby time, and is powered on when a call is received, thereby saving the battery power (cf. Japanese Laid-open Patent Publication No. 08-275243 (paragraph nos. [0161] to [0174], FIG. 12)).

The relay station has a small service area because of its purpose of introduction. Thus, compared with the service area of an ordinary wireless base station, the number of mobile stations that communicate via the relay station is thought to be small. Also, in the middle of the night and early in the morning, the number of mobile stations that communicate via the relay station generally decreases, and possibly, even a situation could occur where no mobile station communicates via the relay station.

Thus, since the relay station is occasionally used by only a small number of mobile stations (or in some cases by no mobile stations), a problem arises in that electric power is consumed wastefully if the relay station is continuously operated.

It is therefore necessary that power control for a power supply of the relay station (power on-off control or intermittent operation control) be executed at the relay station. If the relay station executes such power control on its own judgment, however, the wireless base station and the mobile station lose their party of communication without being notified in advance, with the result that a fault (e.g., connection failure) occurs. Further, if the relay station executes the power control on its own judgment, the resources used by the relay station until then become unavailable.

Figure 5:
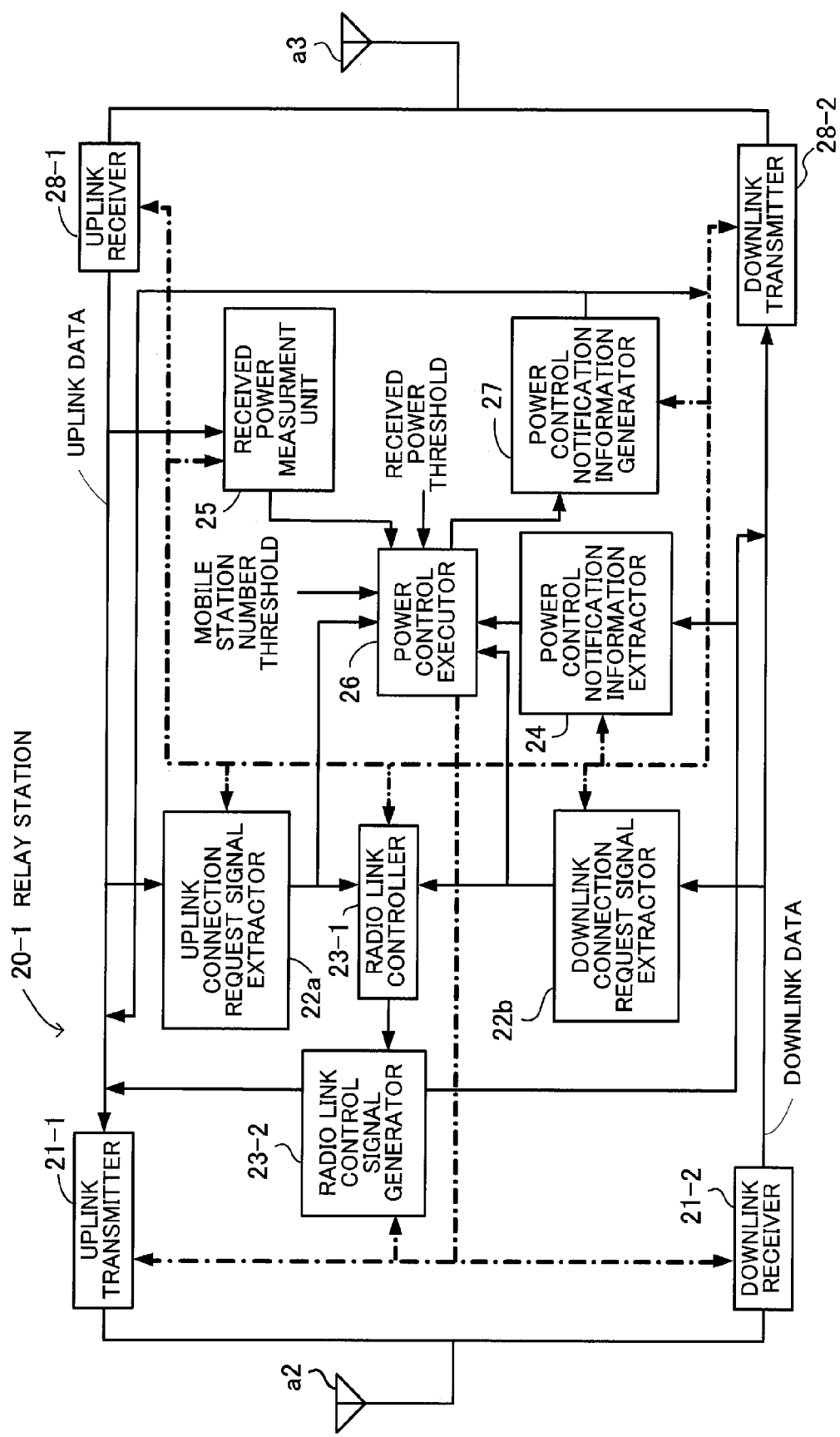
FIG. 5 illustrates an exemplary configuration of a relay station.

FIG. 5 illustrates an exemplary configuration of the relay station. The relay station 20-1 includes antennas a2 and a3, an uplink transmitter 21-1, a downlink receiver 21-2, an uplink connection request signal extractor 22a (corresponding to a signal extractor), a downlink connection request signal extractor 22b, a radio link controller 23-1, a radio link control signal generator 23-2, a power control notification information extractor 24, a received power measurement unit 25, a power control executor 26, a power control notification information generator 27, an uplink receiver 28-1, and a downlink transmitter 28-2. The power control notification information extractor 24, the received power measurement unit 25, the power control executor 26 and the power control notification information generator 27 are the functions included in the power controller 2b illustrated in FIG. 1.

The downlink receiver 21-2 receives via the antenna a2 the radio signal transmitted from the wireless base station 10, then down-converts the received signal, and outputs downlink data. If a downlink connection request signal is included in the downlink data, the downlink connection request signal extractor 22b extracts the downlink connection request signal from the downlink data.

The radio link controller 23-1 performs downlink radio link control in accordance with the downlink connection request signal. The radio link control signal generator 23-2 generates a downlink radio link control signal and superimposes the generated signal on the downlink data.

When the power control notification information is received from the wireless base station 10, the power control notification information extractor 24 extracts the power control notification information from the downlink data and sets power control timing with respect to the power control executor 26. The downlink transmitter 28-2 up-converts the downlink data, on which the radio link control signal and the power control notification information generated by the power control notification information generator 27 are superimposed, and transmits the converted data to the mobile station 30 via the antenna a3.

The uplink receiver 28-1 receives via the antenna a3 the radio signal transmitted from the mobile station 30, then down-converts the received signal, and outputs uplink data.

The received power measurement unit 25 measures the received power from the uplink data. If an uplink connection request signal is included in the uplink data, the uplink connection request signal extractor 22a extracts the uplink connection request signal from the uplink data.

The radio link controller 23-1 performs uplink radio link control in accordance with the uplink connection request signal. The radio link control signal generator 23-2 generates an uplink radio link control signal and superimposes the generated signal on the uplink data. The uplink transmitter 21-1 up-converts the uplink data, on which the radio link control signal and the power control notification information generated by the power control notification information generator 27 are superimposed, and transmits the uplink data to the wireless base station 10 via the antenna a2.

A given value of mobile station number threshold as well as a given value of received power threshold are externally set with respect to the power control executor 26, and in accordance with the uplink and downlink connection request signals, the received power and the externally set thresholds, the power control executor 26 executes the power control (details of the power control will be described later). The elements on which the power control is performed are indicated by dashed arrows in the figure and include, for example, the uplink transmitter 21-1, the downlink receiver 21-2, the uplink receiver 28-1, the downlink transmitter 28-2, the radio link control signal generator 23-2, the uplink connection request signal extractor 22a, the downlink connection request signal extractor 22b, the radio link controller 23-1, the power control notification information extractor 24, the received power measurement unit 25, and the power control notification information generator 27.

Figure 6:
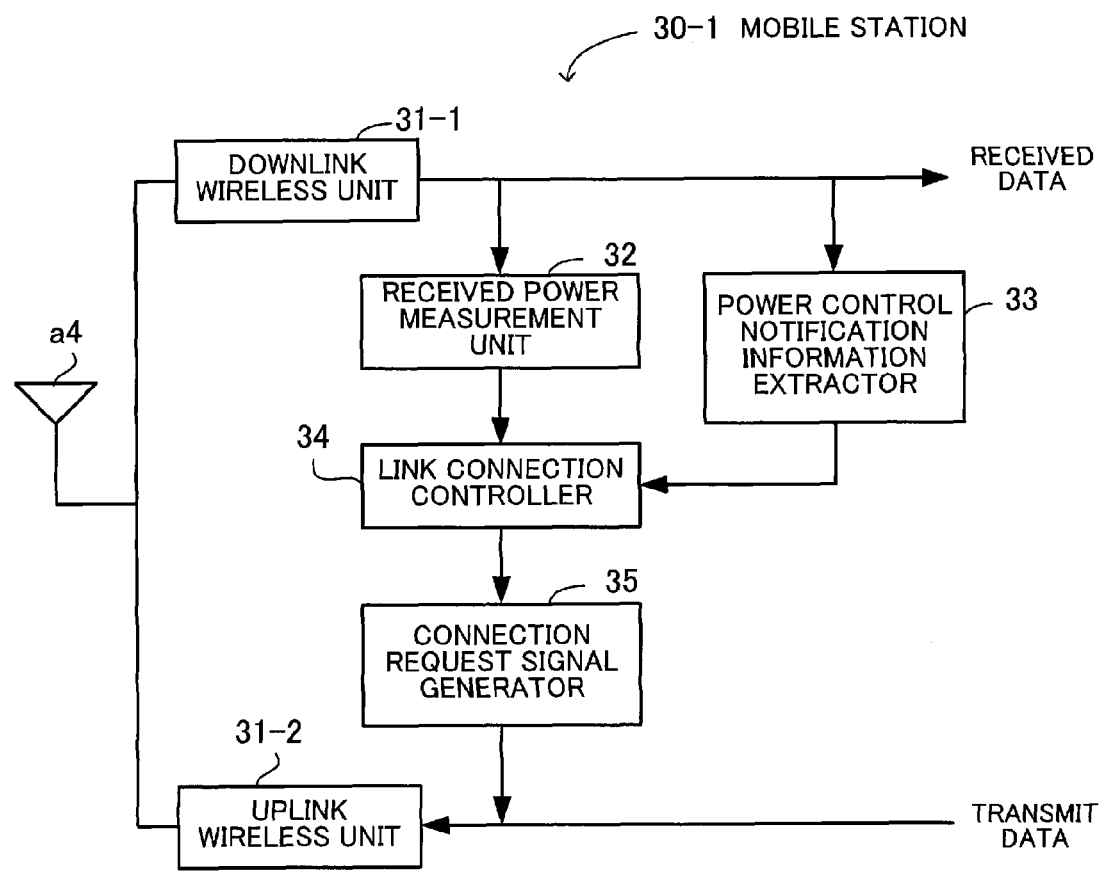
FIG. 6 illustrates an exemplary configuration of a mobile station.

FIG. 6 illustrates an exemplary configuration of the mobile station. The mobile station 30-1 includes an antenna a4, a downlink wireless unit 31-1, an uplink wireless unit 31-2, a received power measurement unit 32, a power control notification information extractor 33, a link connection controller 34, and a connection request signal generator 35.

The downlink wireless unit 31-1 down-converts the radio signal received from the wireless base station 10 or the relay station 20 via the antenna a4, and outputs received data. The received power measurement unit 32 measures the power of the received data. If the power control notification information is included in the received data, the power control notification information extractor 33 extracts the power control notification information from the received data. The link connection controller 34 performs link connection control in accordance with the received power and the power control notification information. The connection request signal generator 35 generates an uplink connection request signal and superimposes the generated signal on transmit data. The uplink wireless unit 31-2 up-converts the transmit data and transmits the converted data via the antenna a4.

The following describes the manner of how the number of mobile stations is calculated at the relay station 20. When mobile stations 30 are communicating with the wireless base station 10 via the relay station 20, the relay station 20 may confirm the number of the mobile stations being relayed thereby by any one of the three methods described below, for example.

1. The relay station 20 measures the received power (or SINR (Signal to Interference plus Noise Ratio)) from each mobile station 30 and compares the measured received power with the received power threshold. If the measured received power is greater than the received power threshold, the relay station 20 regards the corresponding mobile station as a mobile station being relayed thereby. If the measured received power is smaller than the received power threshold, the relay station 20 regards the corresponding mobile station as a mobile station not relayed thereby. Thus, the relay station 20 can recognize the number of the mobile stations being relayed thereby.

The received power may be measured by using any one of RF (Radio Frequency) signal, IF (Intermediate Frequency) signal, demodulated signal, and decoded signal. Also, the received power may be measured by using the Pilot signal (dedicated Pilot or Sounding Pilot) transmitted from the mobile station 30. The received power from the mobile station 30 is measured by the received power measurement unit 25 in FIG. 5, and the number of mobile stations is calculated in the power control executor 26 by comparing the measured received power with the received power threshold.

2. Where the connection request signal or a control signal (e.g., scheduling request) is received from the mobile station 30 via a random access channel, for example, the relay station 20 regards that mobile station 30 as a mobile station being relayed thereby. If such signal is not received from the mobile station 30 over a fixed period of time, the relay station 20 regards that mobile station 30 as a mobile station not relayed thereby. Thus, the relay station 20 can recognize the number of the mobile stations being relayed thereby.

The connection request signal or control signal from the mobile station 30 is extracted by the uplink connection request signal extractor 22a in FIG. 5, and the number of mobile stations is calculated by the power control executor 26.

3. The relay station 20 determines whether the connection request signal or control signal (e.g., scheduling request) transmitted from the mobile station 30 via the random access channel, for example, is directed thereto or to another relay station. If it is judged that the signal is directed to the own relay station 20, the corresponding mobile station 30 is regarded as a mobile station being relayed by the own relay station 20. If it is judged that the signal is directed to a different relay station, the corresponding mobile station 30 is regarded as a mobile station not relayed by the own relay station. Accordingly, the relay station 20 can recognize the number of the mobile stations being relayed thereby.

Whether the connection request signal or control signal from the mobile station 30 is directed to the own relay station or not is determined by the uplink connection request signal extractor 22a in FIG. 5, and the number of mobile stations is calculated by the power control executor 26.

In this manner, the relay station 20 keeps track of the number of the mobile stations being relayed thereby, and compares the number of mobile stations with the threshold value for the number of connected mobile stations (mobile station number threshold), which has been notified from the wireless base station 10 or has been set in advance. If the threshold is not exceeded, the relay station 20 executes the power control. For the mobile station number threshold, "0" may be selected (the number of mobile stations is zero).

Figure 7:
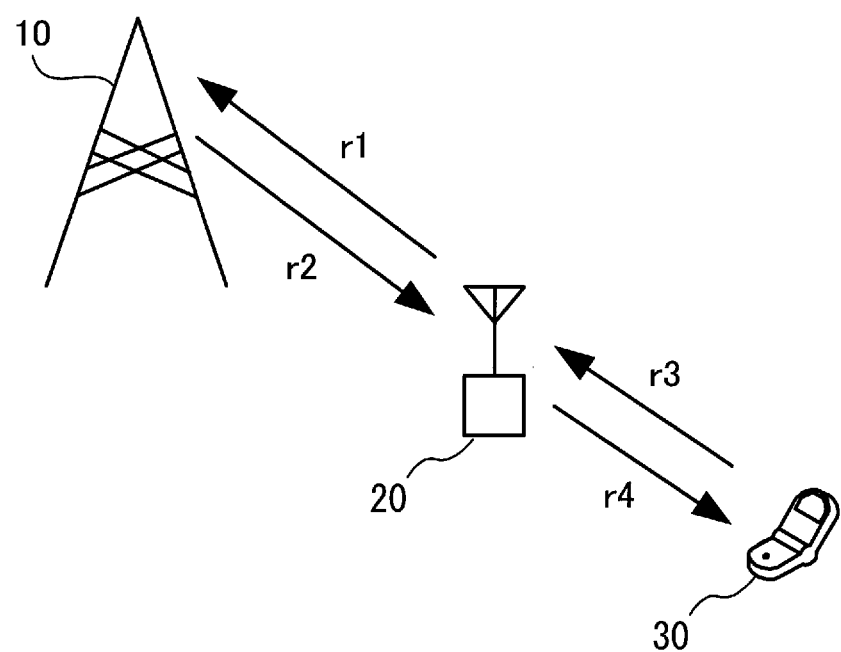
FIG. 7 is a diagram explaining power control.

The power control executed in the relay station 20 will be now explained. FIGS. 7 and 8 are diagrams explaining the power control, wherein FIG. 7 illustrates radio links between the relay station 20 and the wireless base station 10 and between the relay station 20 and the mobile station 30, and FIG. 8 exemplifies power control patterns in relation to the dedicated radio links.

Where one of the following three control actions, namely, power-on, power-off, and intermittent operation, is carried out as the power control on the dedicated radio links r1 to r4 illustrated in FIG. 7, there are a total of 63 ($=4^3-1$) combinations of the control actions, excluding the normal operation in which all radio links are powered on (FIG. 8 illustrates four typical patterns mostly used among the combinations). In the following, the power control patterns (1) to (4) for the relay station 20, illustrated in FIG. 8, will be explained.

(1) The transmitting and receiving systems (radio links r1 and r2) associated with the wireless base station 10 and the transmitting and receiving systems (radio links r3 and r4) associated with the mobile station 30 are all powered off (i.e., the relay station is in its entirety powered off).

(2) The transmitting and receiving systems (radio links r1 and r2) associated with the wireless base station 10 are powered off, and the transmitting and receiving systems (radio links r3 and r4) associated with the mobile station 30 are intermittently operated.

(3) The transmitting and receiving systems (radio links r1 and r2) associated with the wireless base station 10 are powered off, the receiving system (radio link r3) associated with the mobile station 30 is intermittently operated, and the transmitting system (radio link r4) associated with the mobile station 30 is powered on.

(4) The transmitting system (radio link r1) associated with the wireless base station 10 is powered off, the receiving system (radio link r2) associated with the wireless base station 10 is intermittently operated, the receiving system (radio link r3) associated with the mobile station 30 is powered off, and the transmitting system (radio link r4) associated with the mobile station 30 is powered on.

Figure 9:
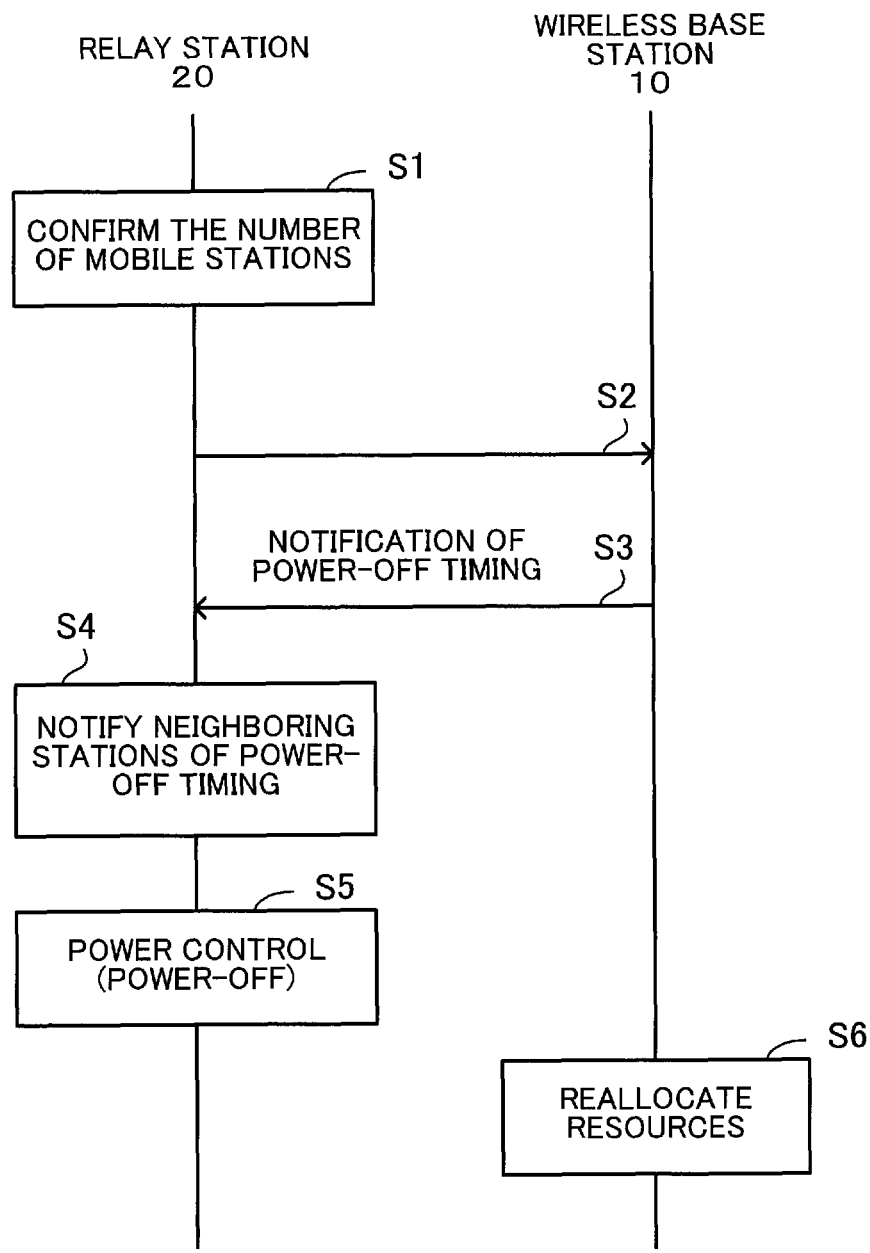
FIG. 9 illustrates an operation sequence for the power control.

An operation sequence for the power control according to the first embodiment will be now described. FIG. 9 illustrates the power control operation sequence, wherein the mobile station number threshold is set to "0".

S1: The power controller 2b compares the number of connected mobile stations with the threshold to determine whether or not the former exceeds the latter.

S2: If the threshold is not exceeded (if the number of mobile station is smaller than or equal to the given number), the relay station 20 notifies the wireless base station 10 and the mobile stations 30 that the relay station 20 will be powered off.

S3: On receiving the notification, the wireless base station 10 determines the timing for powering off the relay station 20 and notifies the relay station 20 of the start timing for initiating the power control (power-off timing).

S4: When notified of the power-off timing, the relay station 20 notifies the other wireless base stations, the mobile stations connected to the relay station 20, and the mobile stations in standby mode of the power-off timing.

S5: The power supply to the relay station 20 is turned off in accordance with the power-off timing.

S6: Where the power supply to the relay station 20 has been turned off, the wireless base station 10 reallocates the radio resources so that the uplink (mobile station 30→relay station 20) and downlink (relay station 20→mobile station 30) radio resources used for the communication by the relay station 20 until then may be used by the wireless base station 10 or other relay stations.

In this manner, the power control of the relay station 20 can be performed, thus making it possible to reduce the power consumption. Generally, in the relay station 20 and the mobile station 30, the transmitting amplifier in particular consumes much power, so that the consumption of power by the transmitter accounts for a large part of the total power consumption. Since the power supply to the transmitter can be turned off, the power consumption can be significantly reduced.

Also, the radio resources that become unused because of the power-off are allocated to other relay stations or the wireless base station, whereby the radio resources can be reused to enable efficient transmission.

In the foregoing description, the relay station 20 is assumed to execute DF (Decode and Forward relaying wherein the received radio signal is relayed by performing thereon processes such as demodulation, error correction decoding, re-encoding, and modulation). The power control can be similarly performed with respect to an AF relay station which is configured to execute AF (Amplify and Forward relaying wherein the received radio signal is merely amplified for relaying and is not decoded) for the data transmission and which is capable of transmitting and receiving the control signal at all times.

Further, in the above exemplary case, it is the relay station 20 that counts the number of mobile stations to execute the power control. Since the wireless base station 10 can identify the mobile stations connected thereto, the wireless communication system may be configured such that the wireless base station 10 counts the number of mobile stations and notifies the relay station 20 of the number of mobile stations (the wireless base station 10 can control the radio links between the wireless base station 10 and the relay station 20 and also can directly or indirectly control the radio links between the relay station 20 and the mobile station 30, and therefore, the wireless base station 10 is capable of counting the number of mobile stations).

A second embodiment will be now described. In the second embodiment, when the power control of the relay station 20 is to be performed, handover is executed with respect to the mobile stations 30 communicating via the relay station 20 and the wireless base station 10.

First, the manner of how the wireless base station, the relay station and the mobile station are configured will be explained. In the following description, like reference signs refer to like elements already explained, and description of such elements is omitted. Only the differences will be described below.

Figure 10:
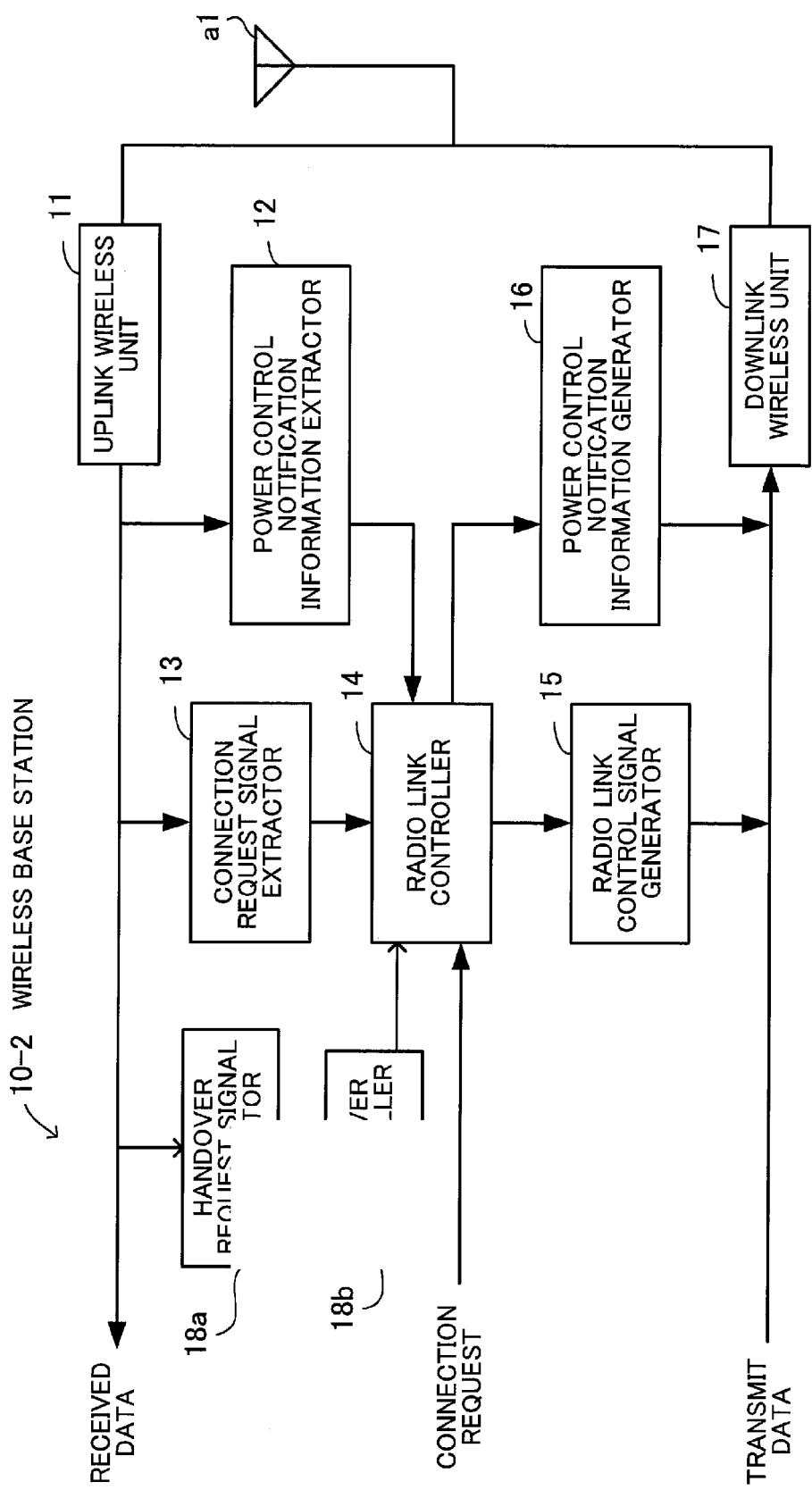
FIG. 10 illustrates an exemplary configuration of a wireless base station.

FIG. 10 illustrates an exemplary configuration of the wireless base station. The wireless base station 10-2 includes the antenna a1, the uplink wireless unit 11, the power control notification information extractor 12, the connection request signal extractor 13, the radio link controller 14, the radio link control signal generator 15, the power control notification information generator 16, the downlink wireless unit 17, a handover request signal extractor 18a, and a handover controller 18b. Thus, the wireless base station 10-2 additionally includes the handover request signal extractor 18a and the handover controller 18b.

If a handover request signal is included in the received data, the handover request signal extractor 18a extracts the handover request signal from the received data. In accordance with the handover request signal, the handover controller 18b executes handover control.

Figure 11:
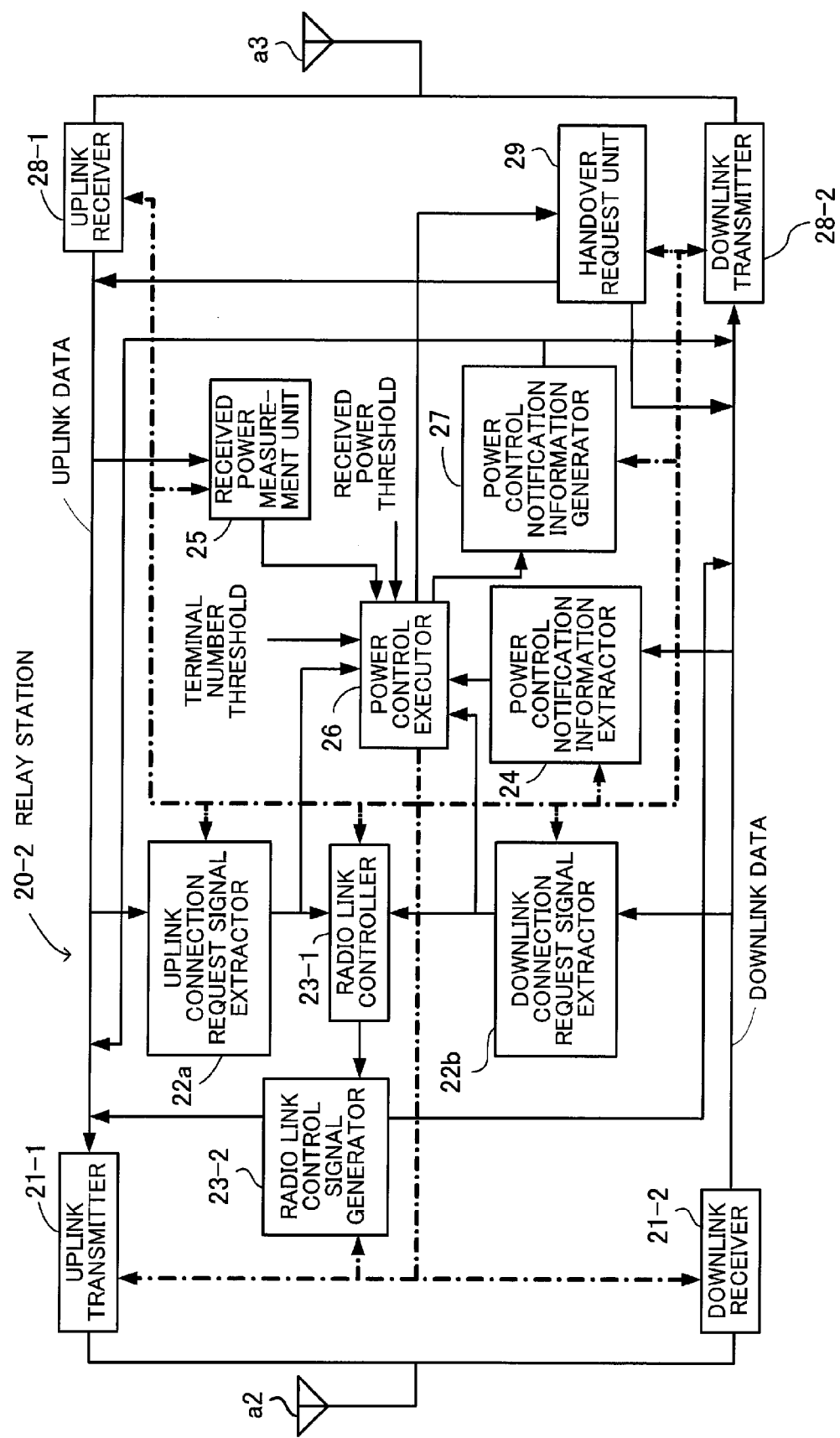
FIG. 11 illustrates an exemplary configuration of a relay station.

FIG. 11 illustrates an exemplary configuration of the relay station. The relay station 20-2 includes the antennas a2 and a3, the uplink transmitter 21-1, the downlink receiver 21-2, the uplink connection request signal extractor 22a, the downlink connection request signal extractor 22b, the radio link controller 23-1, the radio link control signal generator 23-2, the power control notification information extractor 24, the received power measurement unit 25, the power control executor 26, the power control notification information generator 27, the uplink receiver 28-1, the downlink transmitter 28-2, and a handover request unit 29.

Thus, the handover request unit 29 is additionally provided. When the power control is to be executed, the handover request unit 29 generates a handover request signal and superimposes the generated signal on the downlink and uplink data.

Figure 12:
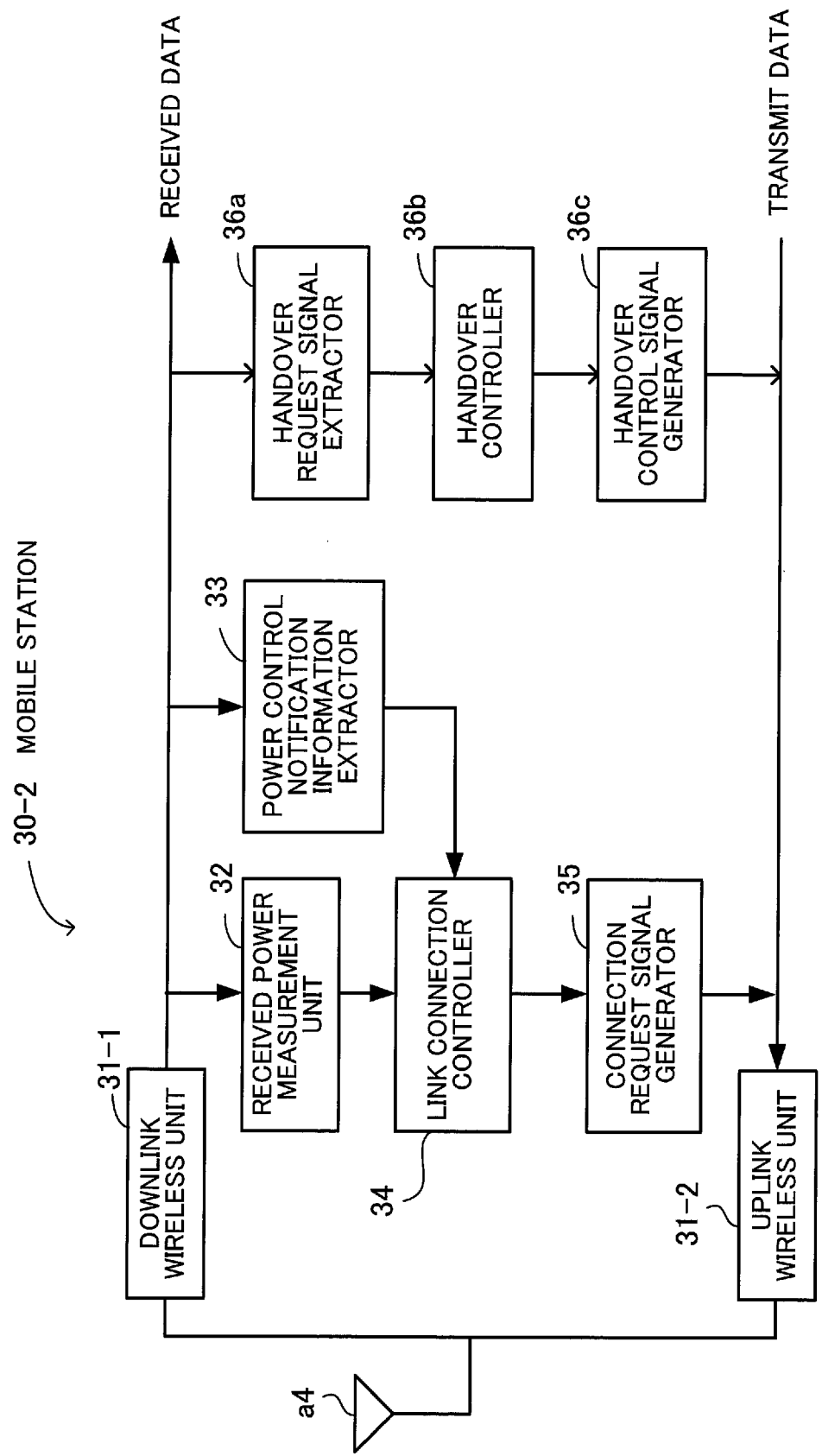
FIG. 12 illustrates an exemplary configuration of a mobile station.

FIG. 12 illustrates an exemplary configuration of the mobile station. The mobile station 30-2 includes the antenna a4, the downlink wireless unit 31-1, the uplink wireless unit 31-2, the received power measurement unit 32, the power control notification information extractor 33, the link connection controller 34, the connection request signal generator 35, a handover request signal extractor 36a, a handover controller 36b, and a handover control signal generator 36c. Thus, the handover request signal extractor 36a, the handover controller 36b and the handover control signal generator 36c are the newly added elements.

If a handover request signal is included in the received data, the handover request signal extractor 36a extracts the handover request signal from the received data. In accordance with the handover request signal, the handover controller 36b executes handover control. The handover control signal generator 36c generates a handover control signal and superimposes the generated signal on the transmit data.

Figure 13:
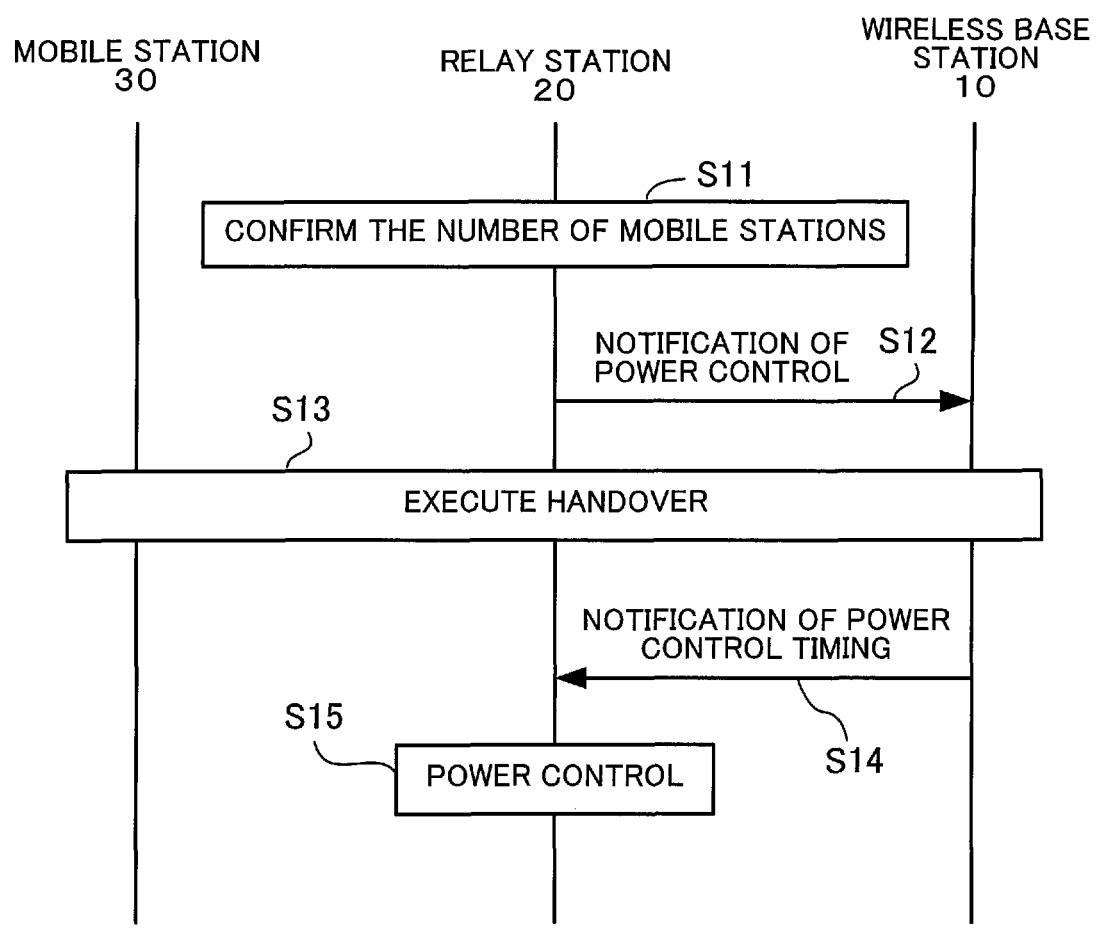
FIG. 13 illustrates an overall operation sequence including handover.

FIG. 13 illustrates an overall operation sequence including handover.

S11: The relay station 20 confirms the number of mobile stations 30 connected thereto.

S12: The relay station 20 notifies the wireless base station 10 that the power control will be executed.

S13: The mobile station 30, the relay station 20 and the wireless base station 10 execute handover.

S14: The wireless base station 10 notifies the relay station 20 of power control timing.

S15: The relay station 20 executes the power control in accordance with the notified power control timing.

Details of the operation will be now explained. The number of mobile stations is compared with the threshold by the power controller 2b of the relay station 20, and if it is judged that the threshold is not exceeded, the power controller 2b notifies the wireless base station 10 and the mobile stations 30 that the relay station 20 will be powered off. Further, the power controller 2b requests of one or more mobile stations 30 then communicating via the relay station 20 and the wireless base station 10 that the mobile stations be handed over to other relay station or wireless base station.

On receiving the handover request, the dedicated mobile stations 30 measure the received powers from other relay stations or wireless base stations to select a target of handover, and then executes handover. When the handover of all mobile stations 30 that received the handover request is completed, the relay station 20 again notifies the wireless base station 10 that the relay station 20 will be powered off.

When the notification is received, the wireless base station 10 determines the timing at which the relay station 20 is to be powered off, and notifies the relay station 20 of the power-off timing. On receiving the notification of the power-off timing, the relay station 20 notifies the mobile stations connected to other wireless base stations or to the relay station as well as the mobile stations in the standby mode of the power-off timing. Subsequently, the relay station 20 is powered off at the power-off timing.

Where the relay station 20 has been powered off, the wireless base station 10 reallocates the radio resources so that the uplink (mobile station 30→relay station 20) and downlink (relay station 20→mobile station 30) radio resources used for the communication by the relay station 20 until then can be used by the wireless base station or other relay stations.

In this manner, the power control of the relay station is executed, so that the power consumption can be reduced. Also, since the radio resources that become unused because of the power-off are allocated to other relay stations or the wireless base station, the radio resources can be reused to achieve efficient transmission.

Further, by carrying out a similar process with respect to wireless base stations and other relay stations, it is possible to cause mobile stations to concentrate at a certain wireless base station or relay station. This enables reduction of the power consumption of the whole system.

A third embodiment will be now described. In the first and second embodiments, the relay station 20 sends the power control request to the wireless base station 10, and on receiving the request, the wireless base station 10 notifies the relay station 20 of the power control timing. In the third embodiment, on the other hand, the relay station 20 itself determines the power control timing and notifies the wireless base station 10 or the mobile stations 30 of the determined timing.

The number of the mobile stations is compared with the threshold by the power controller 2b, and if it is judged that the number of mobile station is smaller than or equal to the threshold, the power controller 2b determines the timing for executing the power control and notifies the wireless base station 10 or the mobile stations 30 that the relay station 20 will be powered off at the determined power-off timing. Also, the power controller 2b requests of one or more mobile stations 30 then communicating via the relay station 20 and the wireless base station 10 that the mobile stations be handed over to other relay station or wireless base station. The subsequent operation is identical with that of the second embodiment.

A fourth embodiment will be now described. In the aforementioned power control of the relay station 20, the power supply to the relay station 20 is turned off. According to the fourth embodiment, the transmitter and receiver of the relay station 20 associated with the wireless base station 10 are powered off while the transmitter and receiver associated with the mobile station 30 are intermittently operated.

Figure 14:
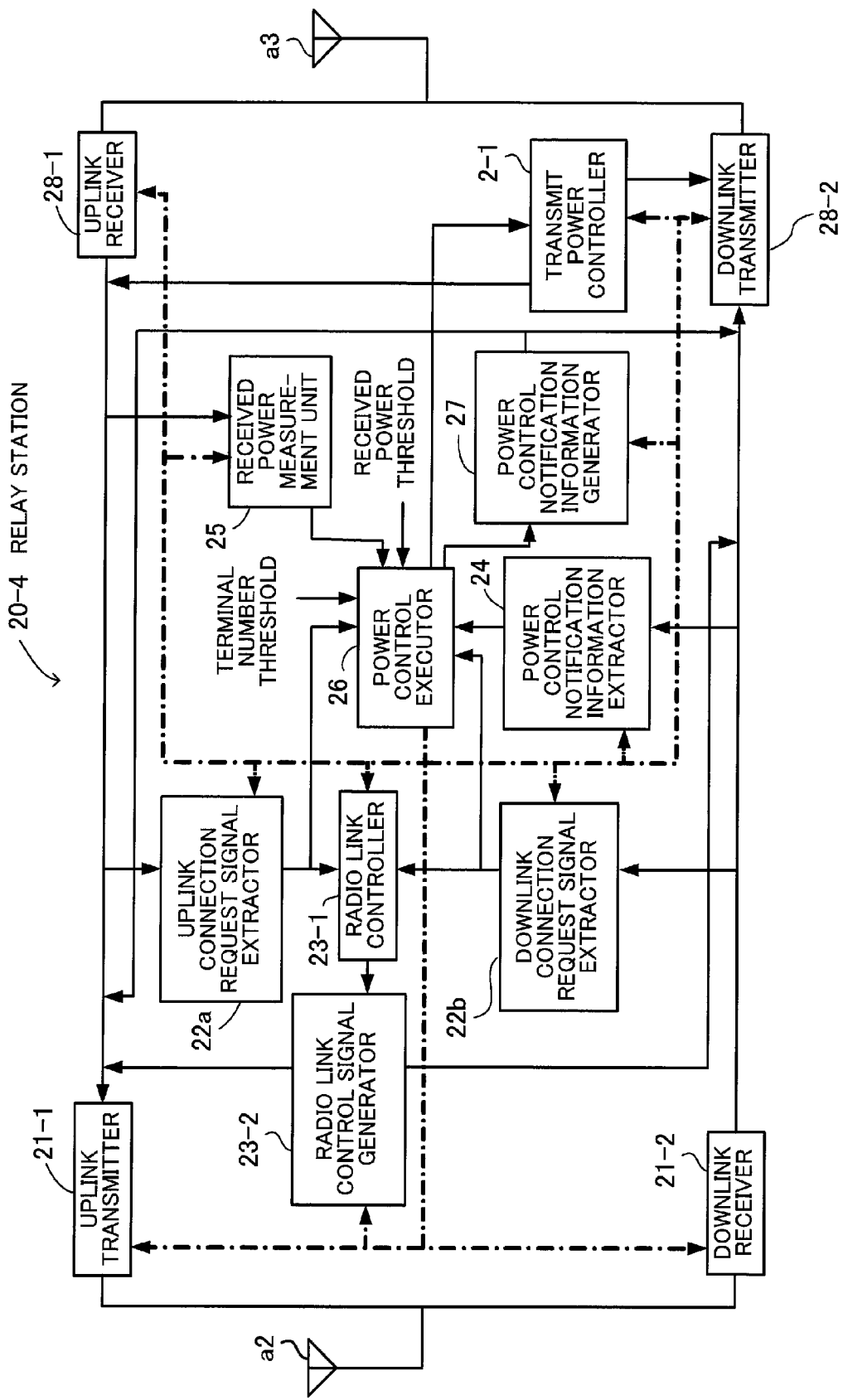
FIG. 14 illustrates an exemplary configuration of a relay station.

FIG. 14 illustrates an exemplary configuration of the relay station. The relay station 20-4 includes the antennas a2 and a3, the uplink transmitter 21-1, the downlink receiver 21-2, the uplink connection request signal extractor 22a, the downlink connection request signal extractor 22b, the radio link controller 23-1, the radio link control signal generator 23-2, the power control notification information extractor 24, the received power measurement unit 25, the power control executor 26, the power control notification information generator 27, the uplink receiver 28-1, the downlink transmitter 28-2, an a transmit power controller 2-1.

Thus, the transmit power controller 2-1 is additionally provided. During the execution of the power control, the transmit power controller 2-1 operates the downlink transmitter 28-2 while reducing the power supplied thereto.

The following describes the operation of the fourth embodiment (control operation whereby the transmitter and receiver associated with the wireless base station 10 are powered off while the transmitter and receiver associated with the mobile station 30 are intermittently operated). The transmission of data from the relay station 20 to the mobile station 30 is stopped. Further, the transmission of common control CH (channels) (or common control signals) to the mobile station 30 is switched to intermittent transmission. Control signals (control CH) necessary for the mobile station 30 to connect to the relay station 20 include, for example, a broadcast channel for transmitting information (e.g., used frequency) about the service area (cell) of the relay station 20, a control channel for transmitting a pilot signal (reference signal) necessary for cell selection, and a synchronization channel for synchronizing between the relay station and the mobile station.

By intermittently transmitting these channels, it is possible to reduce the power consumption. The power amplifier (PA) of the downlink transmitter 28-2, in particular, consumes much power, and therefore, transmitting as little data as possible serves to reduce the power consumption.

Further, the relay station 20 stops receiving the transmit data from the mobile station 30. Also, the relay station 20 receives, on an intermittent basis, the random access channel (RACH) containing a connection request from the mobile station 30, the control signal necessary for the connection, such as pilot, and the control CH. By causing the relay station 20 to operate in this manner, it is possible to execute the power control, whereby the power consumption can be reduced.

A fifth embodiment will be now described. In the fifth embodiment, the transmitter and receiver of the relay station 20 associated with the wireless base station 10 are powered off, the transmitter associated with the mobile station is operated with reduced power, and the receiver associated with the mobile station 30 is intermittently operated.

When the number of mobile stations relayed by the relay station 20 is smaller than or equal to the threshold, the relay station 20 executes the power control in cooperation with the wireless base station 10 and the mobile station 30. Also, to ensure that after the power control is initiated, the relay station 20 can resume the normal operation on receiving a connection request from the mobile station 30, the relay station is allocated specific radio resources less than the radio resources necessary for normal communication.

Figure 15:
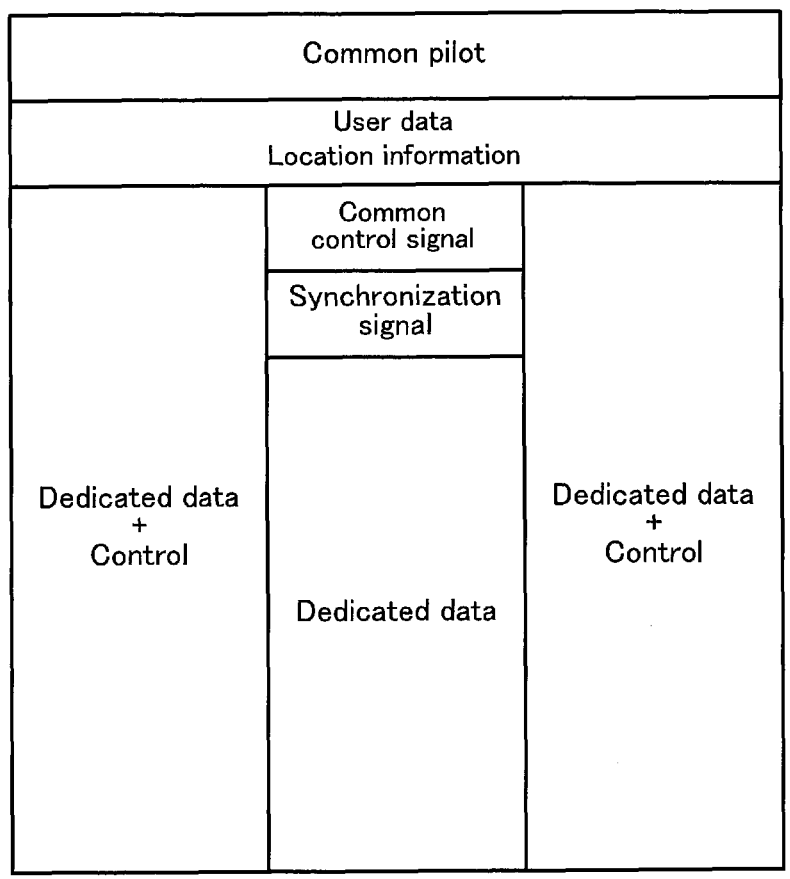
FIG. 15 exemplifies radio resources allocated during normal communication.
Figure 16:
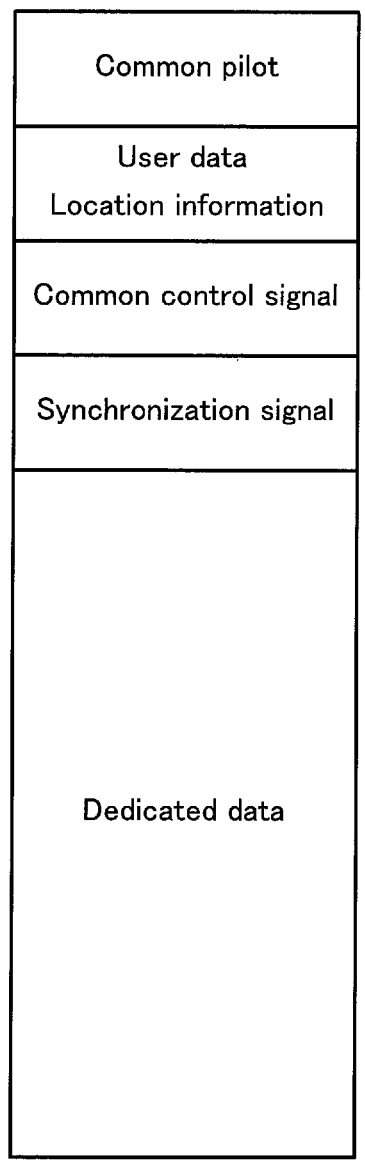
FIG. 16 exemplifies radio resources allocated at the time of band limitation.
Figure 17:
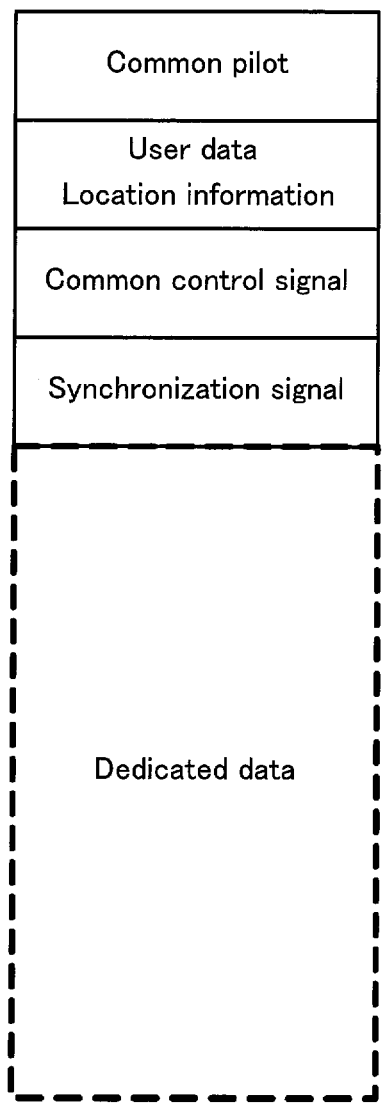
FIG. 17 exemplifies radio resources allocated at the time of band limitation (no mobile stations connected).

Specifically, to ensure connection with the mobile station 30, the relay station 20 requests the wireless base station 10 to allocate radio resources whereby necessary control signals can be transmitted to the mobile station 30 (though, in actuality, no such control signals may be transmitted). As exemplary radio resources, FIG. 15 illustrates exemplary radio resources allocated during the normal communication, FIG. 16 illustrates exemplary radio resources allocated at the time of band limitation, and FIG. 17 illustrates exemplary radio resources allocated at the time of band limitation (no mobile stations connected).

The control signals (control CH) necessary for the mobile station to connect to the relay station 20 include, for example, a broadcast channel for transmitting information (e.g., used frequency) about the service area (cell) of the relay station 20, a control channel for transmitting the pilot signal (reference signal) necessary for cell selection, and a synchronization channel for synchronizing between the relay station 20 and the mobile station 30.

Generally, these control CH are transmitted from the relay station 20 at all times and not on an intermittent basis. Since the transmit power accounts for a large part of the power consumption of the relay station 20, however, the transmit power needs to be suppressed in order to reduce the power consumption of the relay station 20. Thus, some measures need to be taken to suppress the transmit power in order to reduce the power consumption.

On the other hand, the power control of the relay station 20 is executed when the traffic between the relay station and the mobile stations 30 is small, and accordingly, the number of mobile stations that newly originate a call is naturally small. Thus, even if the transmit power for transmitting the aforementioned control signals and control CH is reduced and a virtual service area (cell) narrows as a result, only a limited number of mobile stations fails in connection due to the reduction of the transmit power.

The transmit power for transmitting the control signals and the control CH is reduced, for example, to ½ of the normal transmit power. Specifically, the number of mobile stations and the threshold are compared with each other by the power controller 2b, and if it is judged that the number of mobile stations is smaller than the threshold, the power controller 2b turns off the power supply to the transmitter and receiver associated with the wireless base station 10, and also requests the downlink transmitter 28-2 associated with the mobile stations 30 to reduce the transmit power, so that the transmit power of the downlink transmitter 28-2 is reduced. Also, the power controller 2b notifies the downlink transmitter 28-2 that only the control signals are to be transmitted, so that the downlink transmitter 28-2 is controlled so as to transmit the control signals only.

Further, the power controller 2b performs the power control on the uplink receiver 28-1 such that the uplink receiver 28-1 receives signals on an intermittent basis. The uplink receiver 28-1 may be intermittently operated at intervals equal to the wireless TTI (Transmission Time Interval) or in the time unit of msec. or the like, for example. Also, the intervals of the intermittent operation may be varied in accordance with estimated traffic. By controlling the relay station in the aforementioned manner, it is possible to efficiently reduce the power consumption of the relay station 20.

Figure 18:
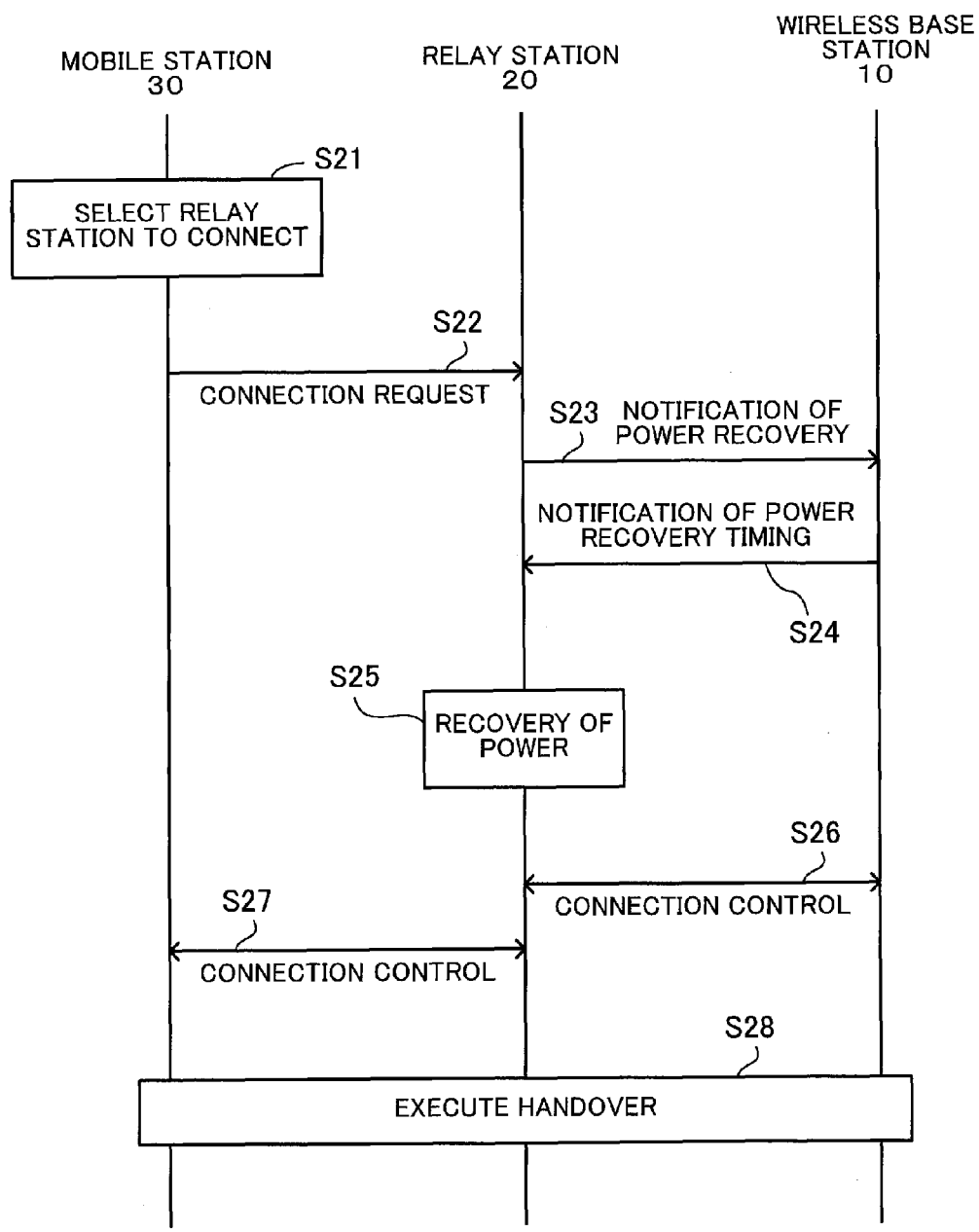
FIG. 18 illustrates an operation sequence for the transition from power-controlled operation to normally powered operation.

Transition from the power-controlled operation to normally powered operation will be now described with reference to a sequence diagram. FIG. 18 illustrates an operation sequence for the transition from the power-controlled operation to the normally powered operation.

S21: On receiving the control signal from the relay station 20, the mobile station 30 measures the received power and compares the measured received power with the received powers from other relay stations or other wireless base stations to select a relay station 20 to connect to.

S22: Where the relay station 20 executing the power control is selected, the mobile station 30 transmits, to the relay station 20, a connection request based on the control signal received from the relay station 20. It is assumed that the radio resources are allocated beforehand so that the connection request can be transmitted from the mobile station 30 to the wireless base station 10 via the control channel, the random access channel or the like.

S23: Prior to the start of communication with the mobile station 30, the relay station 20 notifies the wireless base station 10 that the operation will be switched to normally powered operation.

S24: The wireless base station 10 transmits to the relay station 20 information indicating power recovery timing.

S25: The relay station 20 terminates the power control in accordance with the power recovery timing and switches to the normally powered operation. Specifically, the relay station 20 powers on the transmitting and receiving systems associated with the wireless base station 10, restores to the normal transmit power the transmit power for transmitting the control signals to the mobile station 30, and controls the transmitter so that data can be transmitted therefrom.

S26: Connection control is executed between the wireless base station 10 and the relay station 20 (the relay station 20 requests the wireless base station 10 to reallocate the radio resources or to increase the allocation).

S27: Connection control is executed between the mobile station 30 and the relay station 20.

S28: After the normally powered operation is resumed, the mobile station 30, the relay station 20 and the wireless base station 10 execute handover.

The aforementioned control makes it possible to quickly switch the operation of the relay station from the power-controlled operation back to the normally powered operation. After the normally powered operation is resumed, the mobile station 30 is handed over to the relay station 20 then normally operating with the power normally supplied, so that the mobile station 30 is able to communicate with the wireless base station 10 via the relay station 20. After the relay station 20 resumes the normally powered operation, a handover execution request may be transmitted to execute the handover.

A sixth embodiment will be now described. In the fifth embodiment, when a connection request is received from the mobile station 30, the operation of the relay station is switched from the power-controlled operation to the normally powered operation to recover the power supply. According to the sixth embodiment, the relay station 20 resumes the normally powered operation upon receiving a request from the wireless base station 10.

The wireless base station 10 transmits such a request when, for example, the number of mobile stations connected to a certain wireless base station increases to such an extent that the operation of the relay station 20 needs to be switched to the normally powered operation in order to distribute the load. Also, when the transmission characteristics between the mobile station 30 and the wireless base station 10 need to be improved and the need can be met by connecting the relay station 20, the relay station 20 is requested to resume the normally powered operation.

Figure 19:
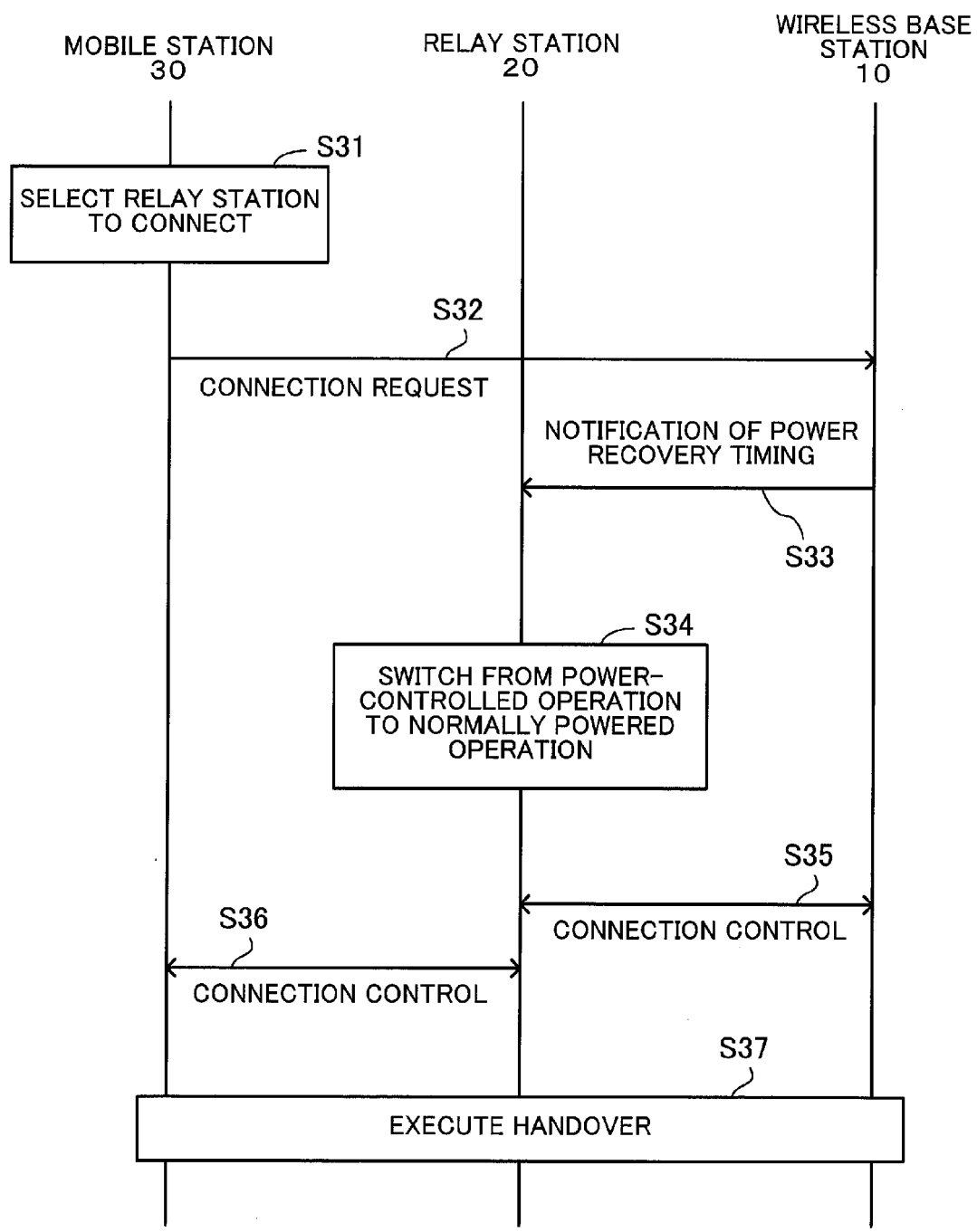
FIG. 19 illustrates an operation sequence for the transition from the power-controlled operation to the normally powered operation.

FIG. 19 illustrates an operation sequence for the transition from the power-controlled operation to the normally powered operation. It is assumed that the mobile station 30 is currently connected to and communicating with the wireless base station 10 and that the relay station 20 operating in the power control operation exists near the mobile station 30 and is transmitting the control signal necessary for connection.

S31: The mobile station 30 starts measuring the received powers for cell selection. Specifically, the mobile station 30 measures the received power from the wireless base station 10 to which the mobile station 30 is currently connected, the received power from the relay station 20, and the received powers from other wireless base stations. Let us suppose that among the measured received powers, the received power from the relay station 20 is found to be the strongest.

S32: The mobile station 30 notifies the wireless base station 10 of the selected cell (in this case, the relay station 20).

S33: On receiving the notification, the wireless base station 10 requests the relay station 20 to switch the operation from the power-controlled operation to the normally powered operation (notification of power recovery timing), and also reallocates the radio resources.

S34: When the request for the transition from the power-controlled operation to the normally powered operation is received, the relay station 20 powers on the transmitter associated with the wireless base station 10 as well as the receiver associated with the mobile station 30 and, using the radio resources allocated by the wireless base station 10, sets up an uplink to the wireless base station 10 and an uplink from the mobile station 30. Setting up the uplink from the mobile station 30 allows the mobile station 30 to transmit a connection request to the relay station 20.

S35: Connection control is executed between the wireless base station 10 and the relay station 20.

S36: Connection control is executed between the mobile station 30 and the relay station 20.

S37: After the relay station 20 resumes the normally powered operation, the mobile station 30 is handed over to the relay station 20 which is then normally operating with the power normally supplied. Consequently, the mobile station 30 can communicate with the wireless base station 10 via the relay station 20. After the relay station 20 resumes the normally powered operation, a handover execution request may be transmitted to execute the handover.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wireless communication system comprising:
   a wireless base station;
   a mobile station configured to communicate with the wireless base station; and
   a relay station including a communication unit, a power controller and a handover request unit, the communication unit configured to relay communication between the wireless base station and the mobile station, the power controller configured to control power of the communication unit, and the handover request unit configured to request the wireless base station and the mobile station to handover to other relay station or other wireless base station,
   wherein the power controller notifies the wireless base station and the mobile station of transition timing from normally powered supply operation to power-supply-controlled operation, and executes after completing the handover at least one of power supply control to cut off power for relaying the communication, power supply control to perform intermittent operation, and power supply control to perform power-saving operation if it is judged that a number of mobile stations communicating with the wireless base station has become smaller than or equal to a given number;
   wherein when the power supply control is to be executed by the power controller, the handover request unit causes the mobile station being relayed or the wireless base station to execute handover to other relay station or other wireless base station, and after the handover is executed, the power controller executes the power supply control; and wherein:
   the wireless base station notifies a timing signal indicating timing for transition from normally powered supply operation to the power supply control, and
   where the power supply control is to be executed, the power controller notifies the wireless base station or the mobile station that the power supply control will be executed, the wireless base station transmits the timing signal to the relay station when notified of execution of the power supply control, and the power controller executes the power supply control in accordance with the timing signal.

2. The wireless communication system according to claim 1, wherein the power controller recognizes a number of relayed mobile stations by measuring received signal powers from the respective mobile stations, comparing the measured received signal powers with a received signal power threshold and regarding a mobile station of which the received signal power is greater than the received signal power threshold as a mobile station being relayed by the relay station, and regarding a mobile station of which the received signal power is smaller than the received signal power threshold as a mobile station not relayed by the relay station.

3. The wireless communication system according to claim 1, wherein:
   the relay station includes a signal extractor configured to receive and extract connection request signals or control signals transmitted from a respective mobile station, and
   where the connection request signal or the control signal is extracted, the power controller regards a mobile station which is transmitting the connection request signal or the control signal, as a mobile station being relayed by the relay station, and regards a mobile station which is not transmitting the connection request signal or the control signal, as a mobile station not relayed by the relay station, to recognize the number of the relayed mobile stations.

4. The wireless communication system according to claim 1, wherein:
   the relay station includes a signal extractor configured to receive and extract connection request signals or control signals transmitted from a respective mobile station,
   the signal extractor determines whether the connection request signal or the control signal extracted thereby is directed to the relay station or the other relay station, and
   where the connection request signal or the control signal is judged to be directed to the relay station, the power controller regards a mobile station which is transmitting the connection request signal or the control signal directed to the relay station, as a mobile station being relayed by the relay station, and where the connection request signal or the control signal is judged to be directed to other relay station, the power controller regards a mobile station which is transmitting the connection request signal or the control signal directed to the other relay station, as a mobile station not relayed by the relay station, thereby recognizing a number of the relayed mobile stations.

5. The wireless communication system according to claim 1, wherein:
   the wireless base station includes a timing signal notifier configured to notify a timing signal indicating timing for transition from normally powered supply operation to the power supply control, and
   where the power supply control is to be executed, the power controller notifies the wireless base station or the mobile station that the power supply control will be executed, the timing signal notifier of the wireless base station transmits the timing signal to the relay station when notified of execution of the power supply control, and the power controller executes the power supply control in accordance with the timing signal.

6. The wireless communication system according to claim 1, wherein, when the power supply control is executed at the relay station, the wireless base station reallocates radio resources of uplink from the mobile station to the relay station and radio resources of downlink from the relay station to the mobile station.

7. The wireless communication system according to claim 1, wherein:
   the relay station includes a handover request unit, and
   the power controller determines timing for executing the power control, the handover request unit transmits information about the timing to the mobile station or the wireless base station to cause the mobile station being relayed or the wireless base station to execute handover to other relay station or other wireless base station, and after the handover is executed, the power controller executes the power supply control.

8. The wireless communication system according to claim 1, wherein the power controller executes the power supply control by powering off a transmitter and a receiver which relay the communication with the wireless base station, and intermittently operating a transmitter and a receiver which relay the communication with the mobile station.

9. The wireless communication system according to claim 1, wherein the power controller executes the power supply control by powering off a transmitter and a receiver which relay the communication with the wireless bases station, operating, with reduced power, a transmitter which relays the communication with the mobile station, and intermittently operating a receiver which relays the communication with the mobile station.

10. The wireless communication system according to claim 1, wherein, if a number of the mobile stations has become larger than the given number or if a connection request is received from the wireless base station or a mobile station, the power controller terminates the power supply control and performs normally powered supply operation.

11. The wireless communication system according to claim 1, wherein:
    the relay station includes a handover request unit, and
    when the power supply control is to be executed by the power controller, the handover request unit transmits a handover request to the mobile station being relayed or the wireless base station, the mobile station and the wireless base station execute handover to other relay station or other wireless base station upon receiving the handover request, and after the handover is executed, the power controller executes the power supply control.

12. A wireless communication method performed by a wireless base station, a mobile station and a relay station, the relay station including a communication unit, a power controller and a handover request unit, the method comprising:
    communicating, by the mobile station, with the wireless base station;
    relaying, by the communication unit, communication between the wireless base station and the mobile station;
    controlling, by the power controller, power of the communication unit, and
    requesting, by the handover request unit, the wireless base station and the mobile station to handover to other relay station or other wireless base station;
    wherein the power controller notifies the wireless base station and the mobile stations of transition timing from normally powered supply operation to power-supply-controlled operation, and executes after completing the handover at least one of power supply control to cut off power for relaying the communication, power supply control to perform intermittent operation, and power supply control to perform power-saving operation if it is judged that a number of the mobile stations communicating with the wireless base station has become smaller than or equal to a given number;
    wherein when the power supply control is to be executed by the power controller, the handover request unit causes the mobile station being relayed or the wireless base station to execute handover to other relay station or other wireless base station, and after the handover is executed, the power controller executes the power supply control; and wherein:

the wireless base station notifies a timing signal indicating timing for transition from normally powered supply operation to the power supply control, and where the power supply control is to be executed, the power controller notifies the wireless base station or the mobile station that the power supply control will be executed, the wireless base station transmits the timing signal to the relay station when notified of execution of the power supply control, and the power controller executes the power supply control in accordance with the timing signal.

13. A relay device comprising:

a relay communicator configured to control transmission and reception of communication relayed between a wireless base station and mobile stations;

a power controller configured to control power of the relay communicator, and a handover request unit configured to request the wireless base station and the mobile station to handover to other relay station or other wireless base station, wherein the power controller recognizes a number of the mobile stations communicating with the wireless base station and notifies the wireless base station and the mobile stations of transition timing from normally powered supply operation to power-supply-controlled operation, and executes after completing the handover at least one of power supply control to cut off power for relaying the communication, power supply control to perform intermittent operation, and power control to perform power-saving operation, if it is judged that the number of the mobile stations has become smaller than or equal to a given number;

and wherein when the power supply control is to be executed by the power controller, the handover request unit causes the mobile station being relayed or the wireless base station to execute handover to other relay station or other wireless base station, and after the handover is executed, the power controller executes the power supply control; and wherein:

the wireless base station notifies a timing signal indicating timing for transition from normally powered supply operation to the power supply control, and where the power supply control is to be executed, the power controller notifies the wireless base station or the mobile station that the power supply control will be executed, the wireless base station transmits the timing signal to the relay station when notified of execution of the power supply control, and the power controller executes the power supply control in accordance with the timing signal.

* * * * *